United States Patent [19]

Eddleman et al.

[11] 4,301,010
[45] Nov. 17, 1981

[54] VACUUM FILTER

[75] Inventors: Roy T. Eddleman, Beverly Hills; Gregory F. Moran, Monrovia, both of Calif.

[73] Assignee: Spectrum Medical Industries, Inc., Los Angeles, Calif.

[21] Appl. No.: 128,937

[22] Filed: Mar. 10, 1980

[51] Int. Cl.³ .............................................. B01D 29/00
[52] U.S. Cl. .................................... 210/406; 210/455; 210/476; 422/101
[58] Field of Search ............... 210/240, 256, 258, 261, 210/262, 282, 406, 416 R, 455, 457, 458, 464, 473, 474, 476, 416.1; 422/101

[56] References Cited

U.S. PATENT DOCUMENTS

| 65,515 | 6/1867 | Spencer | 210/406 |
| 2,449,238 | 9/1948 | Lightfoot | 210/406 |
| 3,010,583 | 11/1961 | Kenyon | 210/406 |
| 3,437,211 | 4/1969 | Lindsey | 210/474 |
| 3,788,483 | 1/1974 | Conway | 210/416 R |
| 4,116,844 | 9/1978 | Hein et al. | 210/455 |
| 4,247,399 | 1/1981 | Pitesky | 210/406 |
| 4,251,366 | 2/1981 | Simon et al. | 210/406 |

FOREIGN PATENT DOCUMENTS

| 2273573 | 2/1976 | France | 210/474 |
| 739485 | 1/1953 | United Kingdom | 210/474 |

Primary Examiner—Peter A. Hruskoci
Attorney, Agent, or Firm—Edgar W. Averill, Jr.

[57] ABSTRACT

A vacuum filter funnel useful for separating solids from liquids. The funnel has a vacuum intake member which forms an airtight seal with a filtrate container, and also forms an airtight seal with an upper funnel member which has a perforated bottom. A threaded sleeve member fits within the upper funnel member and assists in holding the filter medium above the perforated bottom.

4 Claims, 4 Drawing Figures

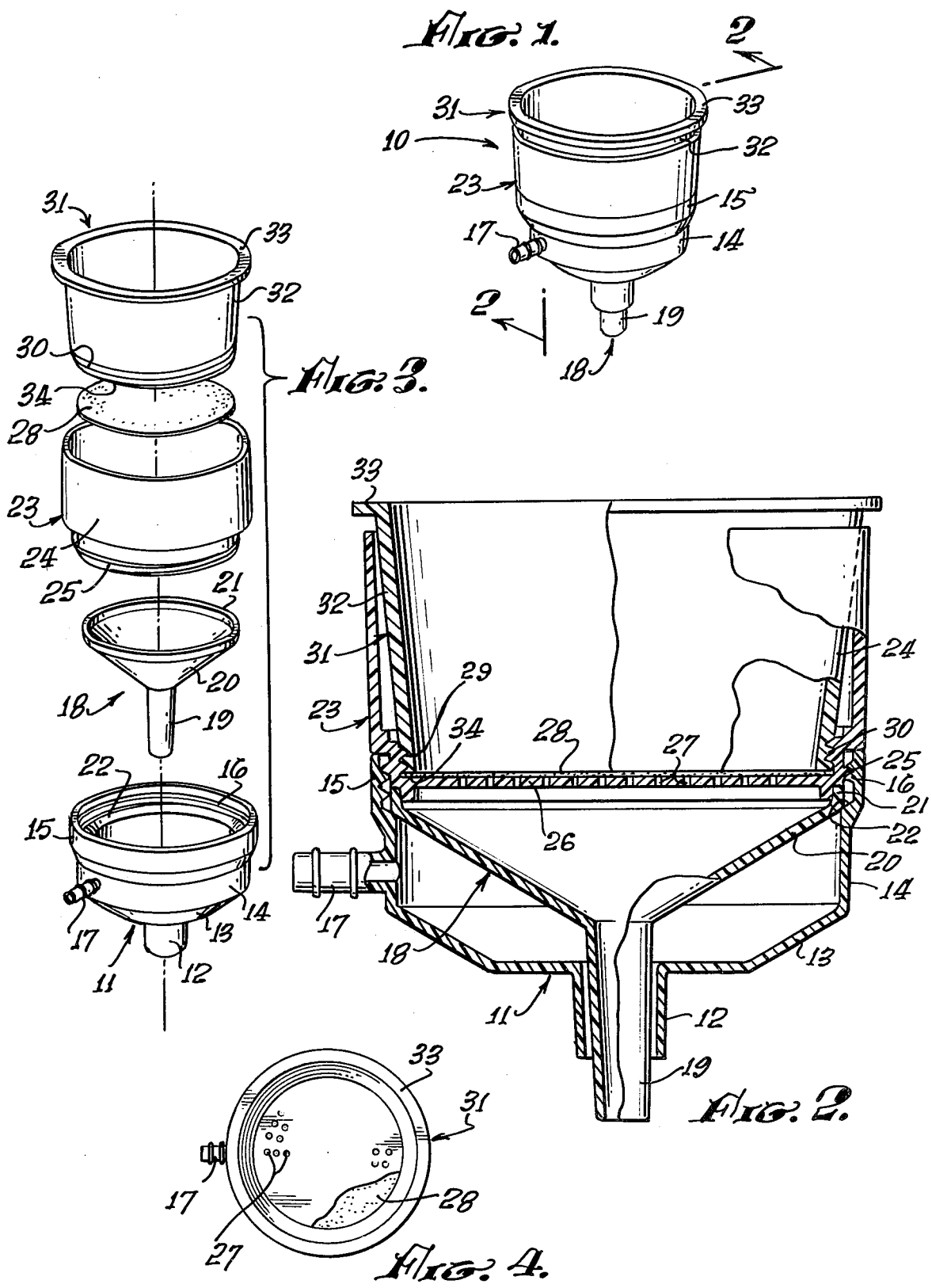

VACUUM FILTER

BACKGROUND OF THE DISCLOSURE

The invention relates to laboratory equipment for chemical laboratories and more specifically to vacuum filter funnels of the shape typically referred to as a buchner funnel.

A buchner funnel typically has an upper cylindrical portion which holds the liquid and solids to be filtered which upper portion terminates in a lower perforated plate. A filter medium such as filter paper is placed on the upper surface of the perforated plate and typically a vacuum is drawn on the lower side of the perforated plate to increase the flow rate of filtrate through the filter medium.

If the filter medium does not conform closely to the perforated plate, it is possible that solids will pass around the outside of the filter medium and through the relatively large perforations in the bottom plate. Such bypassing can be highly detrimental to many chemical laboratory procedures. Although this problem does not occur with frequency with common filter paper, it can be a substantial problem with rigid filter materials such as fritted glass.

SUMMARY OF THE INVENTION

It is thus an object of the present invention to provide a vacuum filter funnel which has a reduced tendency to permit flow around the filter medium thereof.

The present invention is for a vacuum filter funnel useful for separating solids from liquids. The funnel has a vacuum intake member having a bottom outlet which is shaped to form an airtight seal with a filtrate container. The vacuum intake member has a bottom wall extending outwardly and upwardly from its bottom outlet to a sidewall portion which terminates in an upper rim having the means to form an airtight seal with an upper funnel member. The vacuum intake member has a vacuum intake positioned in the sides thereof between the upper rim and the bottom outlet. An upper funnel member is affixed at its lower end to the upper rim of the vacuum intake member in an airtight manner. The upper funnel member holds the solids and liquid to be separated and has a perforated bottom which is provided with a circular ring having a flat upper surface adjacent the inner wall of the upper funnel member. The upper funnel member is generally frustro-conical in shape and has internal threads positioned above the circular ring. A threaded sleeve member is threadingly held within the upper funnel member by external threads which mate with the internal threads of the upper funnel member. The sleeve member also is generally frustro-conical in shape and terminates at its lower end with a circular ring which abuts the circular ring of the upper funnel member. A funnel may be positioned below the perforated bottom of the upper funnel member to direct the filtrate through the bottom outlet of the intake member.

BRIEF DESCRIPTION OF THE DRAWINGS

FIG. 1 is a perspective view of the vacuum filter funnel of the present invention.

FIG. 2 is an enlarged cross-sectional view partly broken away taken along line 2—2 of FIG. 1.

FIG. 3 is an exploded perspective view of the vacuum filter funnel of FIG. 1.

FIG. 4 is a top plan view of the vacuum filter funnel of FIG. 1.

DESCRIPTION OF THE PREFERRED EMBODIMENTS

The vacuum filter funnel of the present invention is shown in perspective view in FIG. 1 and indicated generally by reference character 10. The funnel 10 has four parts shown best in exploded view in FIG. 3. The lower part 11 is a vacuum intake member which has a bottom outlet 12, a frustro-conical sidewall 13, a cylindrical sidewall 14 and an upper rim 15 which contains internal threads 16. A vacuum intake nipple 17 is positioned in the cylindrical sidewall 14 and permits the passage of air or other fluids through wall 14.

A funnel 18 has a lower spout 19 which protrudes through bottom outlet 12 of vacuum intake member 11. Funnel 18 has a conical wall 20 which terminates in an upper ring 21. In use, the bottom outlet 12 of vacuum intake member 11 is placed in an airtight relationship with a filtrate container such as a flask and a vacuum is drawn through intake 17. This draws air or other gases out of the flask through bottom outlet 12. An airtight seal thus is necessary between funnel 18 and the upper portions of vacuum intake member 11. The vacuum intake need not be positioned in vacuum intake member 11, but instead could be provided in the flask or other device to which bottom outlet 12 is connected. This is accomplished in the present invention by an abutment between the upper terminous of conical wall 20 and the conical ring indicated by reference character 22 formed in the inner wall of vacuum intake member 11.

An upper funnel member is indicated by reference character 23 which has a generally frustro-conical sidewall 24. By the term "generally frustro-conical" it is intended to encompass a cone of infinite height that is a cylindrical sidewall, although of course, a frustro-conical sidewall would be useful with the funnel of the present invention. Exterior threads 25 are formed near the bottom of member 23, and these threads mate with the internal threads 16 of intake member 11. Upper funnel member 23 has a perforated bottom plate shown best in FIG. 2 and indicated by reference character 26. Perforated plate 26 has a plurality of holes 27 which permit the passage of filtrate therethrough. A filter medium 28 is positioned above perforated plate 26. The manner in which filter medium 28 is held out will be discussed further below.

Upper funnel member 23 has a set of internal threads 29 as shown in FIG. 2. These internal threads mate with external threads 30 positioned on a threaded sleeve member 31. Threaded sleeve 31 has a generally frustro-conical sidewall 32 which, as above, may be either cylindrical or frustro-conical. Sleeve 31 terminates in an upper rim 33 which helps prevent the passage of fluid between the upper funnel member and the sleeve. In operation, the funnel 18 is inserted in the vacuum intake member 11, and the upper funnel member 23 is threaded tightly against the funnel and into the intake member 11 as shown best in FIG. 2. The filter medium 28 is then placed on the perforated plate 26 and the filter medium extends to the edge of internal threads 29. The threaded sleeve 31 is then screwed into the upper funnel member and its lower surface indicated by reference character 34 abuts the filter medium 28 at its periphery and holds it tightly against perforated plate 26. While the exact shape of perforated plate 26 is not critical, it is important that the outer ring of perforated plate 26 cooperates with the lower surface 34 of sleeve 31 so that a tight seal may be formed between the filter medium 28 and the perforated plate 26. While the lower surface 34 of sleeve 31 is shown as a flat ring which meets with a flat perforated plate, it would, of course, be possible that this lower surface be angled to form a conical seal with the filter medium 28. The important feature is that the threaded sleeve push down against the filter medium and hold it firmly along its outer edge against the outer edge of the perforated plate 26.

The bottom outlet 12 is then connected to a flask or other device in a conventional manner and a vacuum is drawn through intake 17 thereby reducing the pressure below perforated plate 26 in a conventional manner.

The present invention is particularly useful for filter mediums which do not lay flat against the perforated plate 26. For instance, various porous filter mediums such as fritted or sintered glass is relatively rigid and could permit the passage of solids around its exterior if it were not for the provision of threaded sleeve 31. The present invention also permits the use of filter mediums heretofore impossible or impractical because of a tendency to curl and not stay flat against the bottom of a buchner funnel.

The funnel of the present invention can be fabricated from any material which is resistant to the filtrate in solids to be handled thereby. It is preferable, however, that the funnel be made from a thermo plastic material which may be injection molded for ease and economy of fabrication. It is, however, contemplated that the parts could be machined from plastic, metal or other material or be cast or otherwise formed from glass or ceramics.

While the funnel 18 is useful for most applications, it is possible that this member be eliminated and an airtight seal formed between the vacuum intake member and the upper funnel member without the intermediate provision of funnel 18. While the connection between the upper funnel member 23 and the vacuum intake member 11 is shown in the drawings as mating threads 25 and 16, this connection could be formed by other sealing means such as an O ring, a snap fit, circular clamp or the like.

The present embodiments of this invention are thus to be considered in all respects as illustrative and not restrictive; the scope of the invention being indicated by the appended claims rather than by the foregoing description. All changes which come within the meaning and range of equivalency of the claims therefore are intended to be embraced therein.

What is claimed is:

1. A vacuum filter funnel useful for separating solids from liquids, said funnel comprising:

a vacuum intake member having a bottom outlet, said bottom outlet being shaped to form an airtight seal with a filtrate container, said vacuum intake member having a bottom wall extending outwardly and upwardly from said bottom outlet to a sidewall portion which terminates in an upper rim having means to form an airtight seal with an upper funnel member, said vacuum intake member having a vacuum inlet positioned in the side thereof between the upper rim and the bottom outlet thereof;

an upper funnel member affixed at its lower end to the upper rim of the vacuum intake member in an airtight manner for holding the solids and liquid to be separated, said upper funnel member having a perforated bottom having a circular ring with an upper surface adjacent the inner wall thereof, said upper funnel member being generally frustro-conical, said upper funnel member having internal threads positioned above said circular ring;

a threaded sleeve member threadingly held within said upper funnel member by external threads which mate with the internal threads of said upper funnel member, said sleeve member also being generally frustro-conical and terminating at its lower end with a circular ring which abuts the circular ring of the perforated bottom of the upper funnel member; and a funnel positioned below said perforated bottom of the upper funnel member and forming a liquid-tight seal therewith at the upper end of the funnel, said funnel having a lower exit portion which extends through the bottom outlet of the vacuum intake member.

2. The funnel of claim 1 wherein said vacuum inlet is in the sidewall of the vacuum inlet member near the upper terminous thereof.

3. The funnel of claim 1 wherein said vacuum intake member has a frustro-conical bottom portion and a cylindrical sidewall portion.

4. The funnel of claim 1 wherein the means to form an airtight seal between the upper rim of the vacuum intake member and the upper funnel member comprise a threaded portion in said vacuum intake member and a matching threaded portion in said upper funnel member.

* * * * *